United States Patent [19]

Hedrick et al.

[11] Patent Number: 4,690,701
[45] Date of Patent: Sep. 1, 1987

[54] REUSABLE GREASE FILTER

[76] Inventors: Steven E. Hedrick; Alan H. Gates, both of 771 S. Sherman, Denver, Colo. 80209

[21] Appl. No.: 852,559

[22] Filed: Apr. 16, 1986

[51] Int. Cl.⁴ .............................................. B01D 45/16
[52] U.S. Cl. ....................................... 55/436; 55/440; 55/DIG. 36
[58] Field of Search ................. 55/440, 443, 442, 436, 55/DIG. 36

[56] References Cited

U.S. PATENT DOCUMENTS

| | | | |
|---|---|---|---|
| 907,634 | 12/1908 | Narowetz | 55/440 X |
| 1,434,154 | 10/1922 | San | 55/440 X |
| 1,501,559 | 7/1924 | Kaup | 55/440 X |
| 1,686,144 | 10/1928 | Colbert | 55/440 X |
| 2,911,011 | 11/1959 | Niehart | 55/440 X |
| 2,976,954 | 3/1961 | Irwin | 55/442 X |
| 3,276,193 | 10/1966 | Lamb | 55/440 X |
| 3,433,146 | 3/1969 | Russell | 55/DIG. 36 X |
| 4,050,446 | 9/1977 | Giuffre | 55/DIG. 36 X |

Primary Examiner—Kathleen J. Prunner
Attorney, Agent, or Firm—William P. O'Meara

[57] ABSTRACT

A reusable grease filter for installation in an exhaust system for restaurant cooking equipment and the like comprising a frame adapted to be fixedly mounted in an exhaust system opening; louvers positionable within the frame having a plurality of discontinuous overlapping louver surfaces extending generally transversely of an exhaust system airflow direction and providing a plurality of tortuous air passages, whereby passage of flame through the grease filter is substantially blocked by the transversely extending overlapping louver surfaces, and whereby grease and other airborne particles are removed from exhaust air; and brackets fixedly mounted on the frame for stably holding the louvers in a predetermined position and for enabling rapid removal and reinstallation of the louvers in the frame for facilitating cleaning of the louvers. Specific structure of the frame, louvers and brackets which enables these functions is described.

4 Claims, 6 Drawing Figures

REUSABLE GREASE FILTER

BACKGROUND OF THE INVENTION

The present invention relates generally to exhaust systems of the type used for restaurant cooking equipment and more, particularly, to a reusable grease filter adapted to be used at an inlet portion of such an exhaust system.

In commercial cooking operations such as restaurants, the hot air and smoke produced by a cooking surface are conventionally removed by an exhaust system which includes a hood positioned above the cooking surface, an exhaust duct system associated with the hood, and a fan which draws air from beneath the hood and discharges it to the atmosphere outside the restaurant. Grease filters are positioned in the hood at the exhaust duct inlet to remove grease from the air before it enters the exhaust duct. Such filtering is necessary to retard the accumulation of grease in the exhaust system duct work and fan. In order to prevent any grease which does collect in the exhaust duct from being ignited by a fire in the cooking area, most modern day grease filters are adapted to retard the passage of flame therethrough. Conventional prior art grease filters, in order to accomplish both the function of collecting grease and preventing flame passage, have generally consisted of an intertwined wire mat which is sufficiently dense to restrict flame passage while being sufficiently porous to allow air passage. Such grease filters are generally inclined, on the order of 45°, so that grease collecting on the filter wire may flow downwardly and be collected in a grease trough and grease cup positioned at the base of the filter.

A problem with such prior art grease filters is that the intertwined wire surfaces do not lend themselves to rapid cleaning. In modern day restaurant operations, cooking equipment and the associated hood and exhaust system are periodically cleaned and degreased by specialized maintenance contractors who are generally not employees of the restaurant. The cleaning operation is generally performed in a relatively short time which is insufficient for the soaking, etc. that would be necessary for cleaning conventional grease filters. As a result, most modern day grease filters are disposable units which are replaced with each periodic cleaning operation. However, commercial grease filters are relatively expensive and represent a substantial portion of a restaurant's cost for this type of cleaning. It would be generally desirable to provide a grease filter having the equivalent or better grease removal and flame retarding characteristics as conventional grease filters but which is adapted for rapid cleansing and reuse.

OBJECTS OF THE INVENTION

It is an object of the present invention to provide a reusable grease filter for installation in an exhaust system for restaurant cooking equipment and the like.

It is another object of the present invention to provide a reusable grease filter which collects grease efficiently.

It is another object of the present invention to provide a reusable grease filter which retards passage of flame therethrough.

It is also an object of the present invention to provide a reusable grease filter having a plurality of louvers which are readily removed and reinstalled without tools.

It is another object of the present invention to provide a plurality of removable louvers having surfaces thereon which are subsequently totally exposed and may be readily cleaned when the louvers are removed from an associated frame.

It is also an object of the present invention to provide a reusable grease filter having a plurality of generally planar continuous surfaces which facilitate downward flow of grease thereon for facilitating grease flow out of the filter and into an associated collection trough.

It is a further object of the present invention to provide a reusable grease filter which is sturdy in construction and relatively inexpensive to maintain.

SUMMARY OF THE INVENTION

The present invention is directed to a reusable grease filter for installation in an exhaust system for restaurant cooking equipment and the like. The grease filter of the present invention is adapted to remove grease and other airborne fluid particles from exhaust air prior to its entry into the exhaust system duct work and is also adapted to prevent fires in the exhaust system by substantially retarding the passage of flame therethrough. Unlike prior art grease filters, the grease filter of the present invention comprises a plurality of individual louvers which may be easily removed, cleaned, and reinserted during periodic degreasing operations. The removal and reinsertion of the louvers requires no special tools due to the fact that special brackets are used which co-act with the louvers to provide a snap fit of the louvers within the frame structure. The louvers are constructed in a manner to provide a series of completely exposed planar surfaces which readily lend themselves to rapid cleaning by conventional techniques without extended soaking, etc. The planar surfaces also enhance downward grease flow which facilitates collection and removal of grease in an associated grease trough and cup. This enhanced grease flow tends to prevent a grease buildup on the surfaces of the grease filter during use.

DETAILED DESCRIPTION OF THE INVENTION

Figure 6:
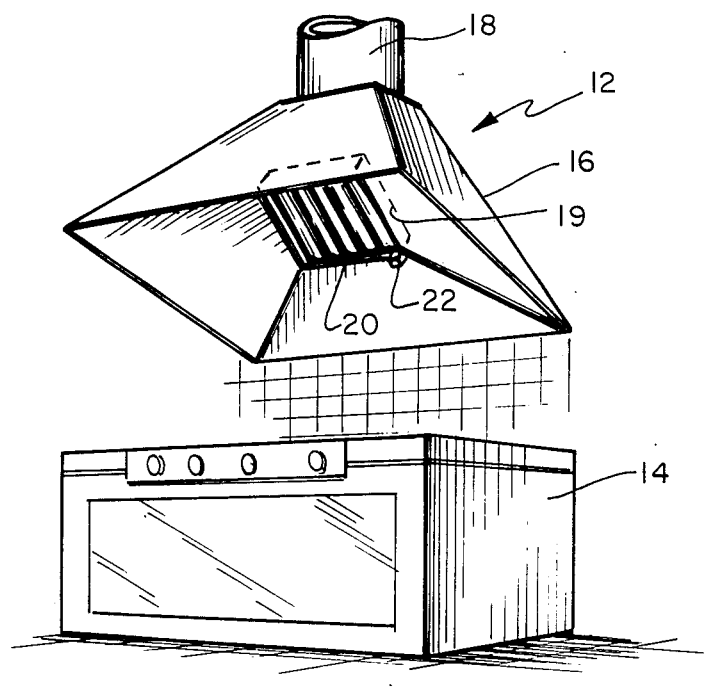
FIG. 6 is a perspective view illustrating a grease filter of the present invention installed in a restaurant exhaust system.

As illustrated in FIG. 6 the grease filter 10 of the present invention is adapted to be used in an exhaust system 12 for restaurant cooking equipment 14 or the like. The grease filter 10 is adapted to be installed in a hood 16 positioned over the cooking equipment 14 at the inlet opening 19 of an exhaust system air duct 18. The grease filter 10 is of the same general size and shape as the opening in the hood 16 so as to completely cover the opening to the air duct 18. A conventional grease trough 20 and associated grease collection cup 22 may be mounted at the lower portion of the grease filter 10, as is conventional with other grease filters, to facilitate collection and removal of grease draining from the grease filter.

Figure 1:
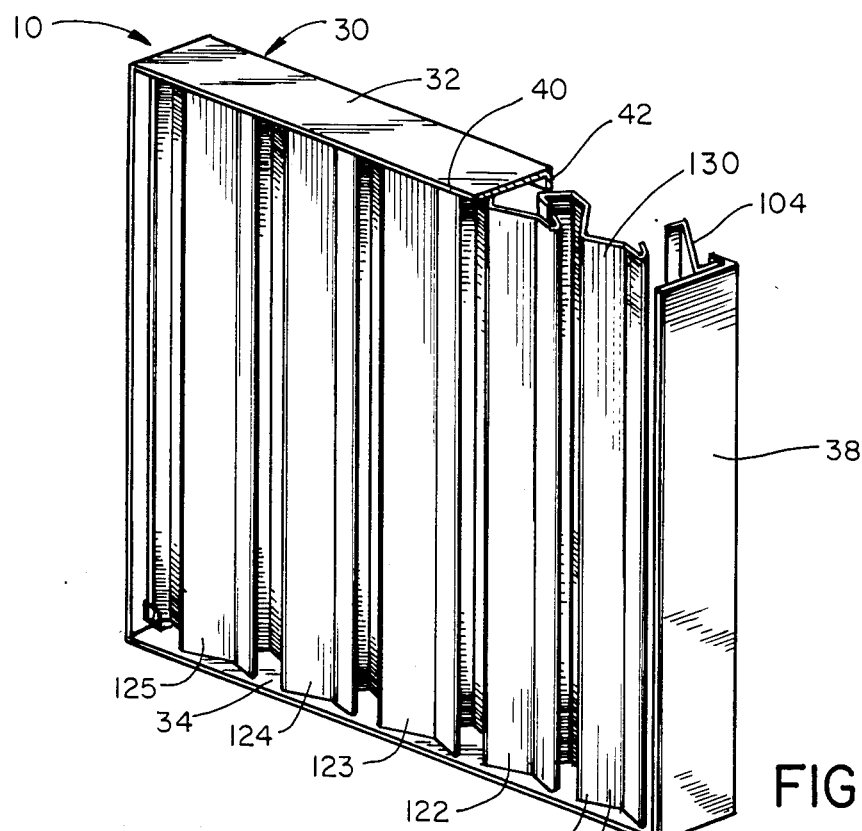
FIG. 1 is a perspective, partially cut away view of a reusable grease filter of the present invention.
Figure 2:
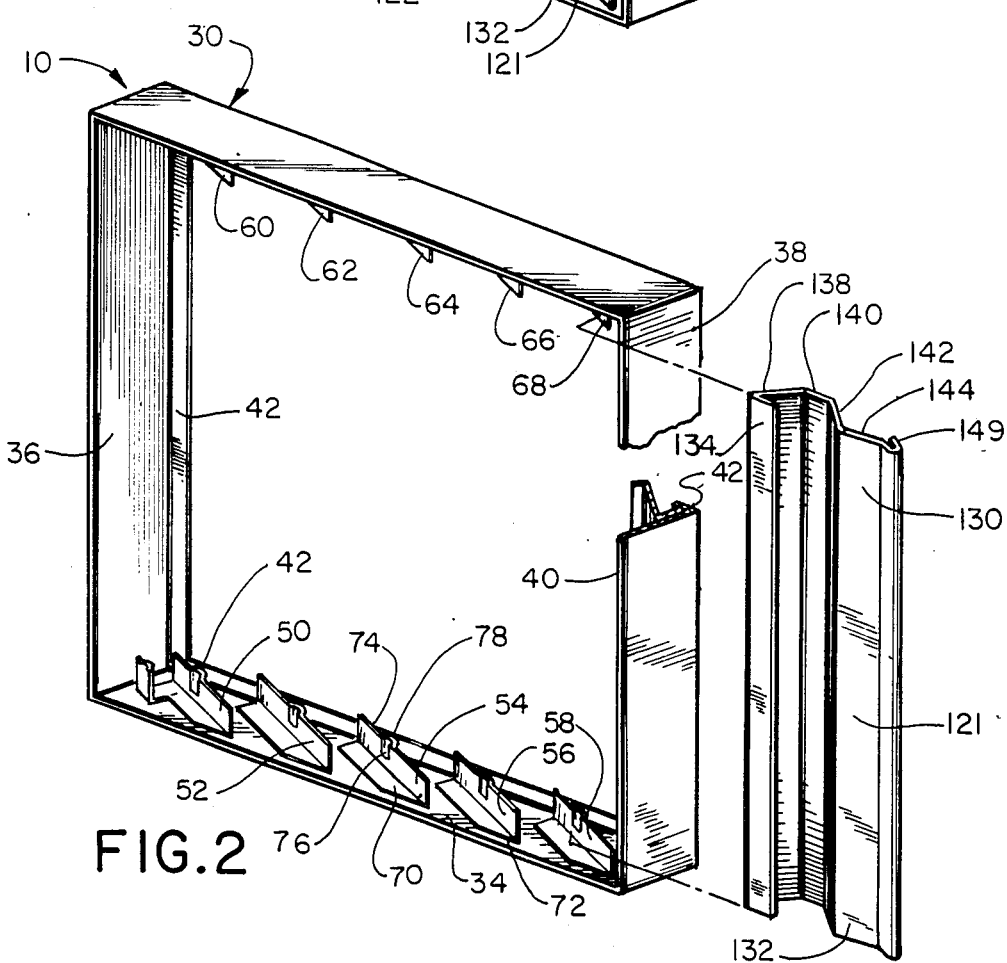
FIG. 2 is a perspective, partially cut away, exploded view of the grease filter of FIG. 1 with louvers removed.
Figure 5:
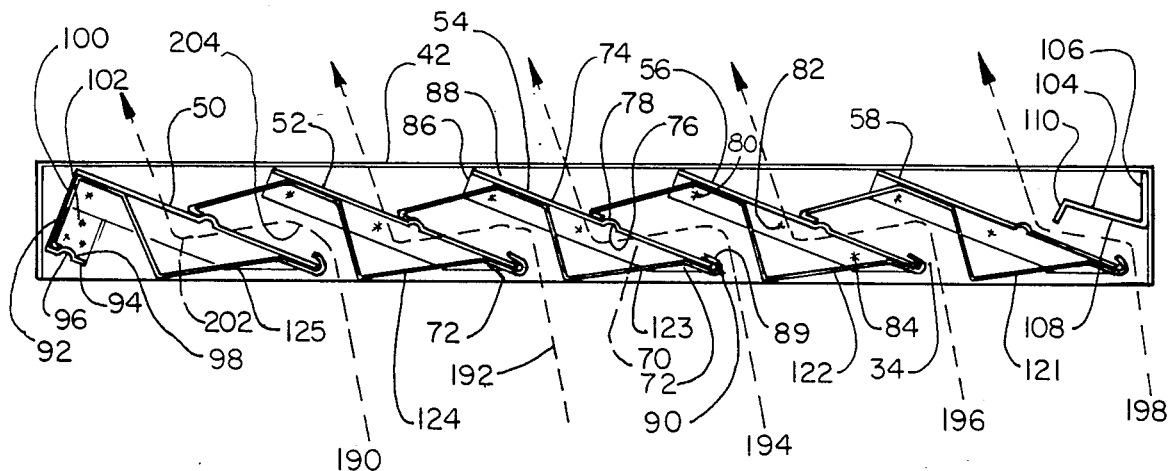
FIG. 5 is a cross sectional top view of a bottom portion of the grease filter of FIGS. 1 and 2.

As illustrated in FIGS. 1 and 2 the grease filter may comprise a frame 30 adapted to conform with the shape of the opening 19 in air duct 18, which in conventional commercial exhaust systems is a square opening. The frame comprises an upper plate 32, a lower plate 34, a left side plate 36 and a right side plate 38 which are connected at the ends thereof as by welding or the like to define a square configuration having a front edge 40. A back peripheral surface of the frame may be formed by inwardly extending flange portions of the plates 32, 34, 36, 38 which are welded together to define a continuous, back edge, peripheral flange 42. The plates 32, 34, 36, 38 may each be 19/16 and 13/16 inch long and 1 15/16 inches wide and may be constructed from a high strength, heat resistant, corrosion resistant material such as galvanized sheet metal. As illustrated in FIGS. 2 and 5, a plurality of bottom retainer brackets 50, 52, 54, 56, 58 are arranged in parallel spaced-apart relationship on frame lower plate member 34 to which they are fixedly attached as by spot welds 80, 82, 84, etc. A plurality of top retainer brackets 60, 62, 64, 66, 68 are provided on upper plate 32 in mirror image relationship with those on the bottom plate. Each of the bracket members comprises an elongate member having an L-shaped cross section including a first plate portion 70 which is attached to an associated frame portion and which may have a beveled terminal edge 72 extending generally parallel to the front edge 40 of the frame. A second plate portion 74 extends perpendicular to the associated portion of the frame to which it is attached and comprises an indention 76 at one surface thereof, which provides an outwardly extending nub surface 78 at the opposite surface thereof, which acts as a stop member for restricting the movement of an associated louver, as described in further detail below. A rearwardly positioned end 86 of each bracket is positioned next to the frame rear flange portion 42 making an acute angle 88 therewith on the order of 20°. A front end portion 89 of each bracket is separated from the forward edge 40 of the frame by a spacing gap 90 which may be on the order of ¼ inch.

An end clip bracket member 92 is provided having a first plate portion 94 projecting perpendicularly from the associated frame portion 34 and extending generally parallel to brackets 50, 52, 54, etc. This plate portion 94 may comprise an indention 96 thereof of the same type as in bracket members 50, 52, 54, etc. which provides an outwardly projecting nub surface 98 adapted to engage the terminal end surface of an end louver as described in further detail hereinafter. The end clip 92 may further comprise a second plate surface 100 and a flush portion 102 which may be welded to the plate member 34. An identical end clip (not shown) may be provided in mirror image relationship on the upper frame member.

A Z-shaped side bracket member 104 having a flat attachment portion 106, an outwardly projecting portion 108 and an end flange portion 110 is fixedly mounted on frame plate portion 38 and extends from the top to the bottom thereof. The Z-shaped side bracket member is adapted to provide a surface overlapping the surface of an endmost louver 121 as described in further detail hereinafter.

Figure 3:
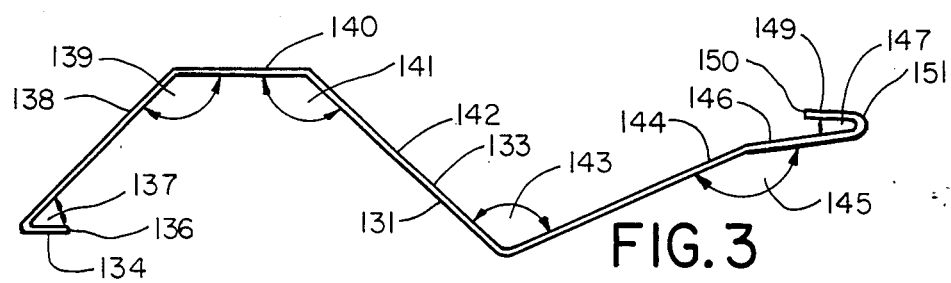
FIG. 3 is a cross sectional view of a louver of the grease filter of FIGS. 1 and 2.
Figure 4:
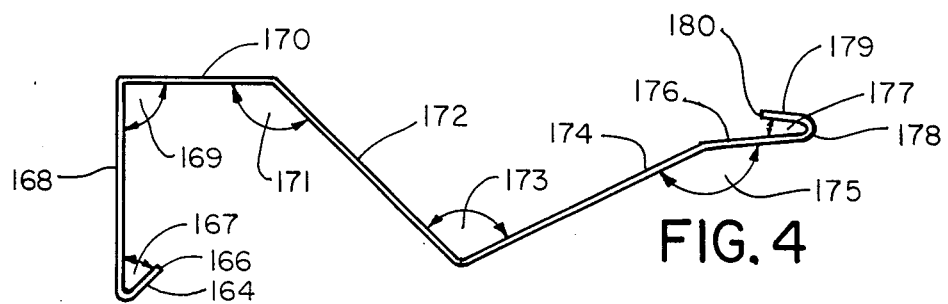
FIG. 4 is a cross sectional view of an end louver of the grease filter of FIGS. 1 and 2.

As shown in FIGS. 1 and 5 the grease filter 10 comprises a first louver 121, a second louver 122, a third louver 123, a fourth louver 124 and a fifth louver 125 which are mounted within the frame 30 by means of associated brackets. Each louver comprises a top end 130, a bottom end 132, a front surface 131 and a back surface 133. Each louver is constructed from a single metal plate which is bent at fold line portions thereof to provide a plurality of integrally connected vertically extending planar surfaces. As illustrated by FIG. 3 each of the louvers 121-124 comprises a first stop engaging portion 134 which may be e.g. 5/16 inch wide, which is adapted to extend parallel to an associated bracket and which terminates in a terminal end surface 136 which is adapted to engage a nub portion of an associated bracket to prevent relative movement of the louver in a forward direction parallel to the bracket. Portion 134 is positioned at a first, acute angle 137, which may be e.g. 45°, with a second louver portion 138, which may be e.g. 1 and ⅜ inches wide, and which is connected by a second, obtuse angle 139, which may be e.g. 135°, to a third louver portion 140 positioned parallel the first portion, which may be e.g. 1 inch wide. The third portion is positioned at a third, obtuse angle 141, which may be e.g. 138°, to a fourth louver portion 142, which may be e.g. 1 and ¾ inches wide. The fourth portion 142 may be connected by a fourth, obtuse angle 143, which may be e.g. 157°, to a fifth louver portion 144, which may be e.g. 1 and ¾ inches wide. Fifth portion 144 may be connected by a fifth, obtuse angle 145, which may be e.g. 162°, to a sixth louver portion 146, which may be e.g. ¾ inch wide, and which is adapted to be positioned parallel an associated bracket surface. The sixth portion 146 may be connected as by a sixth, acute angle 147, which may be e.g. 10°, to a seventh louver portion 149, which may be e.g. ⅜ inches in width. Sixth portion 146 and seventh portion 149 may comprise a relatively small radius, e.g. a 0.03 inch radius, therebetween and collectively may define a C-shaped hook portion 151 which is adapted to engage an associated end portion 89 of a bracket therewithin. The louver terminates in a terminal edge surface 150.

End louver 125 may comprise louver portions and angles 164, 166-180 which are identical to louver portions and angles 134, 136-150 of louvers 121-124, with the exception that angle 169 of louver 125 is 90° rather than 45° to accommodate connection to end clip 92 as illustrated in FIG. 5. It may be seen from FIG. 5 that each louver is adapted to be positioned between two adjacent brackets on the bottom plate (and the oppositely positioned bracket on the top plate, e.g. 56, 58 and 66, 68) e.g. in a manner whereby louver portion 134 is positioned in parallel abutting engagement with one bracket's rearward surface, and the terminal end portion 136 of the louver is positioned immediately rearwardly of an associated nub portion 78 of the same bracket e.g. 56 while louver portion 140 is positioned in parallel abutting engagement with a surface of the adjacent bracket, e.g. 58, and while the louver hook portion 151 receives an end surface 89 of the same adjacent bracket, e.g. 58. It will be appreciated that the resiliency of the metal from which each louver is constructed enables the louver portion 138 to flex upwardly, i.e., to increase angle 139 as the louver is moved rearwardly parallel to a bracket to enable louver portion 134 to slide up and over associated nub portion 78 enabling a "snap fit" of the louver between the two associated brackets. Further rearward movement of the louver is prevented by the engagement of the hook portion 151 of the louver with the end 89 of the adjacent bracket. In order to remove a louver from an associated pair of brackets the louver portion 144 is grasped and pulled in a forward direction parallel to the associated brackets whereby, owing to the engagement of louver terminal edge portion 136 with the associated bracket nub, the louver is caused to resiliently deflect to expand angle 143 to enable the hook portion 151 to be removed from engagement with bracket end portion 89. Thereafter the louver may be rotated in clockwise direction with respect to the intersection of louver portions 138, 140 thereby raising louver portion 134 relative the associated nub portion and enabling the louver to be pulled forwardly and removed from between the two brackets. It will be appreciated that in performing each of these operations an identical operation is being performed between associated bracket pairs on the frame top portion 32.

As shown by FIGS. 1 and 5, when the louvers are positioned in attached relationship with the associated brackets, the opening which is otherwise formed by the frame members 32, 34, 36, 38 is entirely covered by the overlapping louver surfaces. Each louver overlaps an associated louver by approximately 50% of its entire lateral extension. The overlapping louver surfaces define a plurality of tortuous air passages 190, 192, 194, 196, 198 through which exhaust air must pass in flowing from the hood to the exhaust system duct. Each tortuous air passage comprises two oppositely directed, substantially right angle turns 202, 204. The tortuous passages produce a centrifuge-type effect on the liquids entrained within the exhaust air, causing the liquids to be deposited on the surfaces of the louvers. After being deposited on the louver surfaces the liquids tend to flow downwardly to the bottom frame portion of the grease filter from which they are subsequently drained to an associated trough 20 and collection cup 22. The downward drainage of grease, etc. is facilitated by the unobstructed planar surfaces of the louvers.

For cleaning purposes the louvers are removed in the above-described manner from the frame, sprayed with degreasing agent, rinsed and reinserted into the frame. It may be seen that the angular relationship between the various louver surfaces provides a configuration having all of the surfaces substantially exposed which facilitates the above-described grease removal. Thus a grease filter is provided which removes grease from exhaust air, facilitates grease collection in a grease trough, retards flame passage, and is easily cleanable and reusable.

It is contemplated that the inventive concepts herein described may be variously otherwise embodied and it is intended that the appended claims be construed to include alternative embodiments of the invention except insofar as limited by the prior art.

What is claimed is:

1. A reusable grease filter for installation in an exhaust system for restaurant cooking equipment and the like comprising:

frame means having a front portion, a back portion, a top portion, a bottom portion and lateral side portions adapted to be fixedly mounted in an exhaust system opening of similar shape to said frame means for supporting bracket means therein;

louver means positionable within said frame means having a plurality of discontinuous overlapping louver surfaces extending generally transversely of an exhaust system airflow direction and providing a plurality of tortuous air passages extending from a front portion of said louver means to a rear portion of said louver means, whereby passage of flame through said grease filter is substantially blocked by said transversely extending overlapping louver surface, and whereby grease and other airborne particles are removed from exhaust air passing through said tortuous passages through contact with said louver surfaces;

bracket means fixedly mounted on said frame means for stably holding said louver means in a predetermined position in said frame means and for enabling rapid removal and reinstallation of said louver means in said frame means for facilitating cleaning of said louver means;

wherein said louver means comprise a plurality of generally planar louver surfaces extending continuously from said top of said frame means to said bottom of said frame means and defining said tortuous air passages, whereby grease and other airborne liquids collecting on said louver means is provided an unobstructed downwardly directed flow path by said planar surfaces to said bottom of said frame means, whereby said liquids are readily collectable in grease trough devices associated with said bottom of said frame means;

wherein said louver means comprises a plurality of individual louvers, each louver being integrally formed from a single metal plate and comprising a plurality of generally planar surfaces defining said planar louver surfaces and positioned in nonenclosing relationship with one another, whereby substantially all of said surfaces of a louver which is removed from said frame means are exposed, whereby said louvers are readily cleanable and reusable;

wherein said bracket means comprise a plurality of individual brackets mounted on said frame means top and bottom portions, said brackets each comprising an elongated inwardly projecting plate portion, said elongated plate portions of said brackets being arranged in parallel spaced apart relationship on said frame means, said brackets on said top portion of said frame means being positioned in mirror image relationship with said brackets on said bottom portion of said frame means;

wherein each said louvers comprises a plurality of vertically extending fold lines defining said plurality of planar surfaces, said louvers being relatively resiliently deflectable at said fold lines and having a shape adapted to fit in snug engagement between opposite portions of two laterally adjacent bracket plate portions whereby movement of said louver in a direction perpendicular to said bracket plate portions is restricted;

said louver means further comprising a hook shaped end portion adapted to receive a terminal end portion of said plate portion of an associated bracket therein for restricting the movement of said louver in a first direction generally parallel said bracket plate portion;

each said bracket comprising a nub surface protruding outwardly from said plate portion adapted to engage a terminal edge surface of an associated louver in snap-fit relationship, which edge surface is positioned at an end of said louver opposite said hook shaped end portion, for preventing movement of said louver in a second direction parallel to said bracket plate portion subsequent to snap-fit engagement of said louver with said nub surface.

2. The invention of claim 1 wherein a louver positioned in fixed engaged relationship with associated brackets is removably disengageable therefrom without tools through relative resilient deflection of said generally planar louver surfaces.

3. The invention of claim 2 wherein said tortuous air passages each comprise a plurality of oppositely directed substantially right angle turns.

4. The invention of claim 3 wherein said frame means comprises four plate members defining said front, back, top and bottom portions and having surfaces extending parallel to the direction of airflow in said exhaust system interconnected in a square configuration and having rearwardly positioned flange members fixedly connected to each plate member and interconnected to form an inwardly projecting square configuration.

* * * * *